US010766570B2

(12) United States Patent
Tokito et al.

(10) Patent No.: US 10,766,570 B2
(45) Date of Patent: Sep. 8, 2020

(54) SHIFTING OPERATION DETECTING APPARATUS

(71) Applicant: HONDA MOTOR CO., LTD., Tokyo (JP)

(72) Inventors: Akira Tokito, Kawagoe (JP); Naotada Matsudaira, Tokyo (JP); Eisuke Kajihara, Niiza (JP); Kazumitsu Yamamoto, Tokorozawa (JP); Tatsuya Ryuzaki, Iruma-gun (JP); Kosuke Tsunashima, Sayama (JP); Junya Ono, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 527 days.

(21) Appl. No.: 15/711,995

(22) Filed: Sep. 21, 2017

(65) Prior Publication Data

US 2018/0086418 A1    Mar. 29, 2018

(30) Foreign Application Priority Data

Sep. 29, 2016  (JP) .................................. 2016-192230

(51) Int. Cl.
*F16H 59/68* (2006.01)
*F16H 61/28* (2006.01)
(Continued)

(52) U.S. Cl.
CPC ............. *B62M 25/08* (2013.01); *B62K 23/08* (2013.01); *F16H 59/044* (2013.01); *F16H 59/68* (2013.01);
(Continued)

(58) Field of Classification Search
CPC ............. F16H 61/4061; F16H 61/4078; F16H 61/4104; F16H 61/4139
(Continued)

(56) References Cited

U.S. PATENT DOCUMENTS

| 9,212,737 | B2* | 12/2015 | Nakamura | ............... | F16D 21/02 |
| 9,285,029 | B2* | 3/2016 | Kojima | ................. | F16D 48/064 |
| 9,303,764 | B2* | 4/2016 | Saitoh | ..................... | F16H 63/38 |
| 9,567,967 | B2* | 2/2017 | Miyashita | ............... | F02D 29/06 |

(Continued)

FOREIGN PATENT DOCUMENTS

| CN | 104412763 | 3/2015 |
| CN | 205075992 U | 3/2016 |
| CN | 105765256 | 7/2016 |
| JP | 61-052590 U | 4/1986 |
| JP | 05-026065 | 2/1993 |
| JP | H07-230741 A | 8/1995 |

(Continued)

OTHER PUBLICATIONS

Japanese Office Action dated Nov. 26, 2019, with English translation, 8 pages.

(Continued)

*Primary Examiner* — Ha Dinh Ho
(74) *Attorney, Agent, or Firm* — Rankin, Hill & Clark LLP

(57) ABSTRACT

A shifting operation detecting apparatus includes a gearbox and a shift change apparatus. The shift change apparatus includes a shifting operation unit, a shifting operation receiving section, a swing lever and a connecting member. A shift operation detector is disposed between the swing lever in an outer shaft section of the shifting operation receiving section and a gearbox case to directly detect a pivoted state of the shifting operation receiving section, and the connecting member is connected to the swing lever from the gearbox case side.

8 Claims, 13 Drawing Sheets

(51) Int. Cl.
*F16H 63/30* (2006.01)
*F16H 59/02* (2006.01)
*B62M 25/08* (2006.01)
*B62K 23/08* (2006.01)
*F16H 59/04* (2006.01)
*B62K 11/00* (2006.01)
*B62M 25/06* (2006.01)
*B62M 25/00* (2006.01)

(52) U.S. Cl.
CPC .............. *B62K 11/00* (2013.01); *B62M 25/06* (2013.01); *B62M 2025/006* (2013.01); *F16H 61/2807* (2013.01); *F16H 63/304* (2013.01); *F16H 2059/0234* (2013.01); *F16H 2063/3076* (2013.01)

(58) Field of Classification Search
USPC .......................................................... 74/335
See application file for complete search history.

(56) References Cited

U.S. PATENT DOCUMENTS

| | | | | |
|---|---|---|---|---|
| 9,776,615 | B2* | 10/2017 | Matsuzaki | B60K 6/485 |
| 10,041,587 | B2* | 8/2018 | Matsubara | F16H 61/12 |
| 10,156,270 | B2* | 12/2018 | Finkenzeller | F16D 13/52 |

FOREIGN PATENT DOCUMENTS

| | | |
|---|---|---|
| JP | 2007-230741 A | 9/2007 |
| JP | 2010-236588 A | 10/2010 |
| JP | 2011-196433 A | 10/2011 |
| JP | 2015-068420 A | 4/2015 |
| WO | 2010/000395 A1 | 1/2010 |

OTHER PUBLICATIONS

Indian Office Action dated Nov. 29, 2019, 7 pages.
Japanese Notice of Allowance with English translation dated Jun. 25, 2020, 6 pages.

\* cited by examiner

EMBODIMENT

COMPARATIVE EXAMPLE

SHIFTING OPERATION DETECTING APPARATUS

CROSS-REFERENCE TO RELATED APPLICATION

The present application claims priority based on Japanese Patent Application No. 2016-192230 filed Sep. 29, 2016, the contents of which are incorporated herein by reference.

BACKGROUND OF THE INVENTION

Field of the Invention

The present invention relates to a shifting operation detecting apparatus.

Description of Related Art

In the related art, in order to detect a shifting operation by a driver's foot, in Japanese Unexamined Patent Application, First Publication No. H05-026065, a twist type pressure sensor is disposed adjacent to an end portion of a shift spindle. In the above-mentioned technology, there is a need to extend the shift spindle to an extent that the pressure sensor is disposed adjacent to the end portion of the shift spindle.

SUMMARY OF THE INVENTION

Incidentally, in a power unit configured to perform a shifting operation by a driver's foot, while a structure in which a shift spindle and a shift pedal are linked via a link mechanism is employed, when the shift spindle extends as described above, the link mechanism needs to be offset and laid out outside in a vehicle width direction, a position of the shift pedal is disposed outside in the vehicle width direction, and an influence is exerted to a foot shifting operability or a foot resting property due to increasing a vehicle width around a driver's feet.

Here, an aspect of the present invention is provided to prevent shifting parts from overhanging around a driver's foot in a vehicle width direction in a shifting operation detecting apparatus configured to detect a shifting operation by the driver's foot.

In order to accomplish the above-mentioned object, a shifting operation detecting apparatus according to an aspect of the present invention employs the following configurations.

(1) An aspect of the present invention is a shifting operation detecting apparatus including a gearbox accommodated in a gearbox case and configured to transmit and output a driving force received in an input shaft from a drive source to an output shaft via any one shifting gear of a shifting gear group having a plurality of stages; and a shift change apparatus including a shifting pedal that receives a shifting operation by a foot operation of a driver and configured to change the shifting gear of the gearbox, the shift change apparatus including: a shifting operation unit accommodated in the gearbox case and configured to change the shifting gear of the gearbox; a shifting operation receiving section having an outer shaft section protruding outward from the gearbox case, receiving the shifting operation by the foot operation of the driver to pivot around a shaft of the outer shaft section and configured to transmit a pivotal movement to the shifting operation unit; a swing lever integrally pivotably installed on the outer shaft section of the shifting operation receiving section; and a connecting member configured to interlockably connect the swing lever and the shifting pedal, wherein a shift operation detecting means is disposed between the swing lever and the gearbox case in the outer shaft section of the shifting operation receiving section to directly detect a pivoted state of the shifting operation receiving section, and the connecting member is connected to the swing lever from the gearbox case side.

(2) In the aspect of (1), the swing lever may be formed such that a tip portion to which the connecting member is connected is offset with respect to a base end portion to which the shifting operation receiving section is coupled at a side away from the gearbox case, and a connecting section of the connecting member with respect to the swing lever may be disposed between the tip portion of the swing lever and the shift operation detecting means.

(3) In the aspect of (1), at least a portion of the shift operation detecting means may be fitted into the gearbox case.

(4) In the aspect of (1), at least a portion of the shift operation detecting means may be fitted into a through-hole formed in an outer wall of the gearbox case, and a collar section having a width larger than that of the outer wall may be formed on a circumferential edge of the through-hole in a thickness direction of the outer wall.

(5) In the aspect of (4), an insertion section seal member may be interposed between an inner circumferential surface of the collar section and an outer circumferential surface of a fitting protrusion fitted into the collar section of the shift operation detecting means.

(6) In the aspect of (1), the shift operation detecting means may have a sensor unit installed on an outer circumference of the outer shaft section of the shifting operation receiving section and configured to detect pivotal movement of the outer shaft section in a non-contact manner, and shaft outer circumference seal members may be interposed between the outer shaft section and the shift operation detecting means at both sides of the outer shaft section in the axial direction with the sensor units sandwiched therebetween.

(7) In the aspect of (1), the shift operation detecting means may be formed such that a diameter of an opening through which the outer shaft section of the shifting operation receiving section passes is reduced at an outside in a vehicle width direction farther than the outer wall to be smaller than that of a through-hole formed in an outer wall of the gearbox case.

(8) In the aspect of (1), the shift operation detecting means may have a sensor case fixed to the gearbox case, and a shaft receiving section configured to rotatably support the outer shaft section may be installed in an area of the sensor case through which the outer shaft section passes.

According to the aspect of (1), in the shift change apparatus for performing a shifting operation of the gearbox using the shifting pedal, while the outer shaft section extends outward from the gearbox case when the shift operation detecting means is disposed on the outer shaft section of the shifting operation receiving section, even in this case, since the connecting member configured to connect the swing lever installed on the outer shaft section and the shifting pedal is connected to the swing lever from the gearbox case side, the outer shaft section extends due to disposition of the shift operation detecting means to the outer shaft section of the shifting operation receiving section, and even when the swing lever is offset to the outside of the gearbox case, the connecting member is disposed closer to the gearbox case than the swing lever, and offset to the outside of the shifting pedal can be made unnecessary. For this reason, the shifting pedal and the connecting member can be prevented from protruding around a driver's foot in the vehicle width direction, and operability and a foot resting property of the foot shifting can be appropriately maintained.

According to the aspect of (2), as the tip portion of the swing lever is offset, a space is likely to be formed between the tip portion and the shift operation detecting means disposed closer to the gearbox case than the swing lever, and the connecting section of the connecting member with respect to the swing lever can be disposed in the space. For this reason, compact disposition can be achieved by preventing the connecting member from protruding in the vehicle width direction.

According to the aspect of (3), since at least a portion of the shift operation detecting means is fitted into the gearbox case, protrusion of the shift operation detecting means in the vehicle width direction can be prevented, and miniaturization around the shifting operation receiving section of the outer shaft section can be achieved.

According to the aspect of (4), as the collar section having a width larger than that of the outer wall is formed on the insertion section (the through-hole) of the outer wall of the gearbox case, the shift operation detecting means can be firmly fitted and held, and a positional deviation of the shifting operation receiving section with respect to the outer shaft section can be suppressed.

According to the aspect of (5), as the insertion section seal member is interposed between the collar section of the through-hole of the gearbox case and the fitting protrusion of the shift operation detecting means, sealability of the through-hole can be secured.

According to the aspect of (6), when the sensor unit configured to detect pivotal movement of the outer shaft section in a non-contact manner is used as the shift operation detecting means, as the shaft outer circumference seal members are interposed between the outer shaft section and the shift operation detecting means at both sides with the sensor units sandwiched therebetween, the sensor unit can be prevented from being influenced by oil from the gearbox, foreign substances from outside of the vehicle, or the like, and the detection accuracy of the sensor unit can be secured.

According to the aspect of (7), since the outer diameter of the opening through which the outer shaft section passes is reduced at the outside in the vehicle width direction farther than the outer wall to be smaller than that of the through-hole of the outer wall of the gearbox case, the intrusion path of foreign substances such as dust or the like from outside in the vehicle width direction can be narrowed, influences due to intrusion of foreign substances can be prevented, and the detection accuracy of the sensor unit can be secured.

According to the aspect of (8), since the outer shaft section of the shifting operation receiving section extending for installation of the shift operation detecting means is supported by the shaft receiving section of the sensor case of the shift operation detecting means, flexibility of the extended outer shaft section can be effectively suppressed.

DESCRIPTION OF EMBODIMENTS

Figure 1:
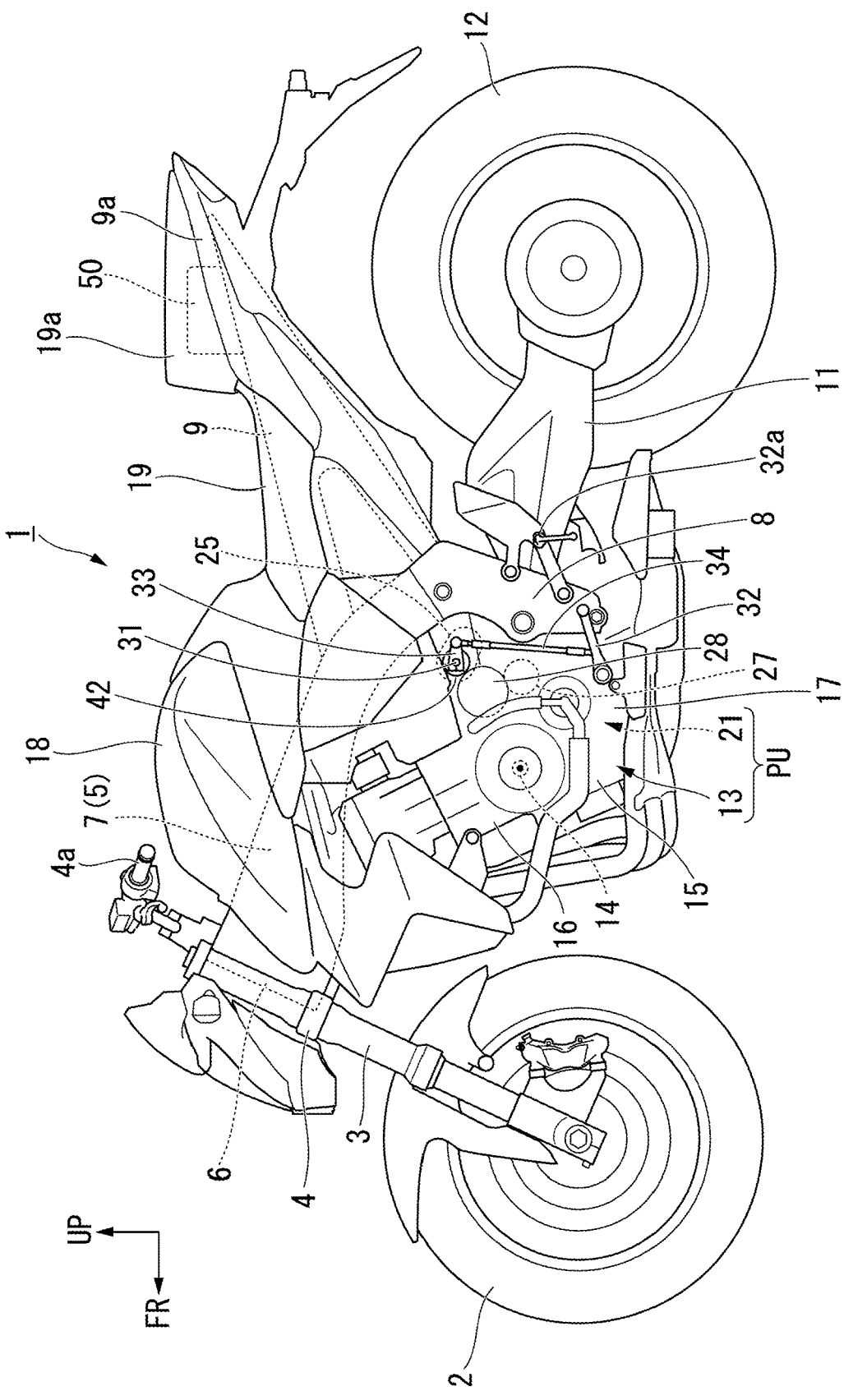
FIG. 1 is a left side view of a motorcycle according to an embodiment of the present invention.

Hereinafter, embodiments of the present invention will be described with reference to the accompanying drawings. Further, directions of forward, rearward, leftward, rightward, and so on, to be described below are the same as directions of a vehicle to be described below unless the context clearly indicates otherwise. In addition, in appropriate places in the drawings used in the following description, an arrow FR showing a forward direction with respect to a vehicle, an arrow LH showing a leftward direction with respect to the vehicle and an arrow UP showing an upward direction with respect to the vehicle are provided.

First Embodiment

As shown in FIG. 1, an embodiment is applied to a motorcycle 1, which is a saddle riding vehicle. A front wheel 2 of the motorcycle 1 is supported by lower end portions of a pair of left and right front forks 3. Upper sections of the left and right front forks 3 are supported by a head pipe 6 of a front end portion of a vehicle body frame 5 via a steering stem 4. A bar type steering handle 4a is attached to a top bridge of the steering stem 4.

The vehicle body frame 5 includes the head pipe 6, main tubes 7 extending from the head pipe 6 toward a lower rear side at a center in vehicle width direction (a leftward/rightward direction), left and right pivot frames 8 continuous with lower sides of rear end portions of the main tubes 7, and a seat frame 9 continuous with rear sides of the main tubes 7 and the left and right pivot frames 8. Front end portions of swing arms 11 are swingably pivoted in the left and right pivot frames 8. A rear wheel 12 of the motorcycle 1 is supported by the rear end portions of the swing arms 11.

A fuel tank 18 is supported over the left and right main tubes 7. A front seat 19 and a rear seat cover 19a are supported over the seat frame 9 behind the fuel tank 18 to be arranged in a forward/rearward direction. Surroundings of the seat frame 9 are covered by a rear cowl 9a. A power unit PU serving as a prime mover of the motorcycle 1 is hung from lower sides of the left and right main tubes 7. The power unit PU is linked to the rear wheel 12 via, for example, a chain type transmission mechanism.

The power unit PU integrally has an engine 13 disposed at a front side thereof and a gearbox 21 disposed at a rear side thereof. The engine 13 is, for example, a multiple cylinder engine having a rotary shaft of a crankshaft 14 in a leftward/rightward direction (a vehicle width direction). The engine 13 has a cylinder 16 standing up above a front section of a crank case 15. A rear section of the crank case 15 is a gearboxcase 17 configured to accommodate the gearbox 21.

Figure 2:
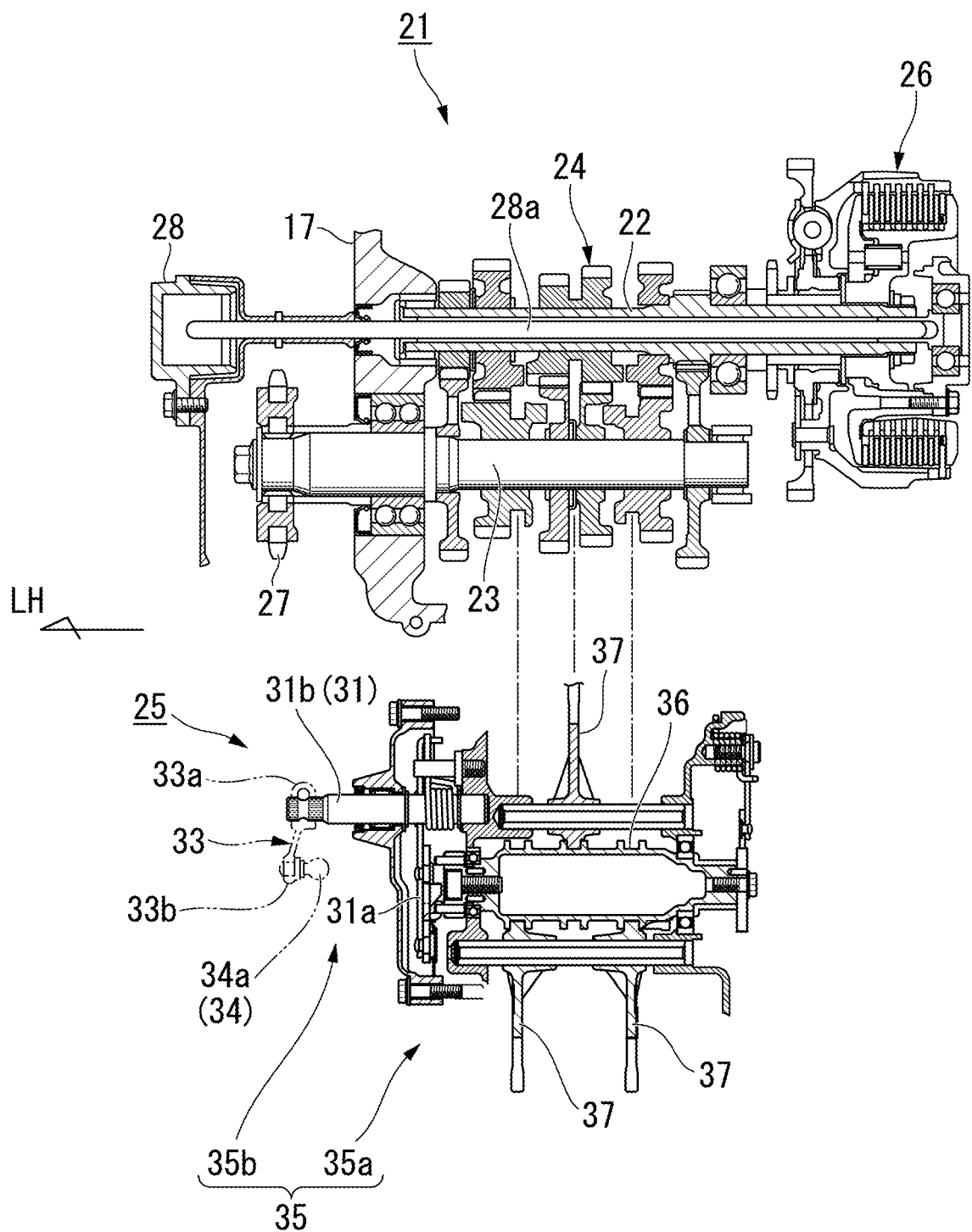
FIG. 2 is a cross-sectional view of a gearbox and a change mechanism of the motorcycle.

As shown in FIG. 2, the gearbox 21 is a stepped transmission having a main shaft 22 (an input shaft) and a counter shaft 23 (an output shaft), and a shifting gear group 24 that bridges both of the shafts 22 and 23. The counter shaft 23 constitutes an output shaft of the gearbox 21, and consequently, the power unit PU. An end portion of the counter shaft 23 protrudes toward a left side of a rear section of the crank case 15 and is connected to the rear wheel 12 via the chain type transmission mechanism.

Figure 3:
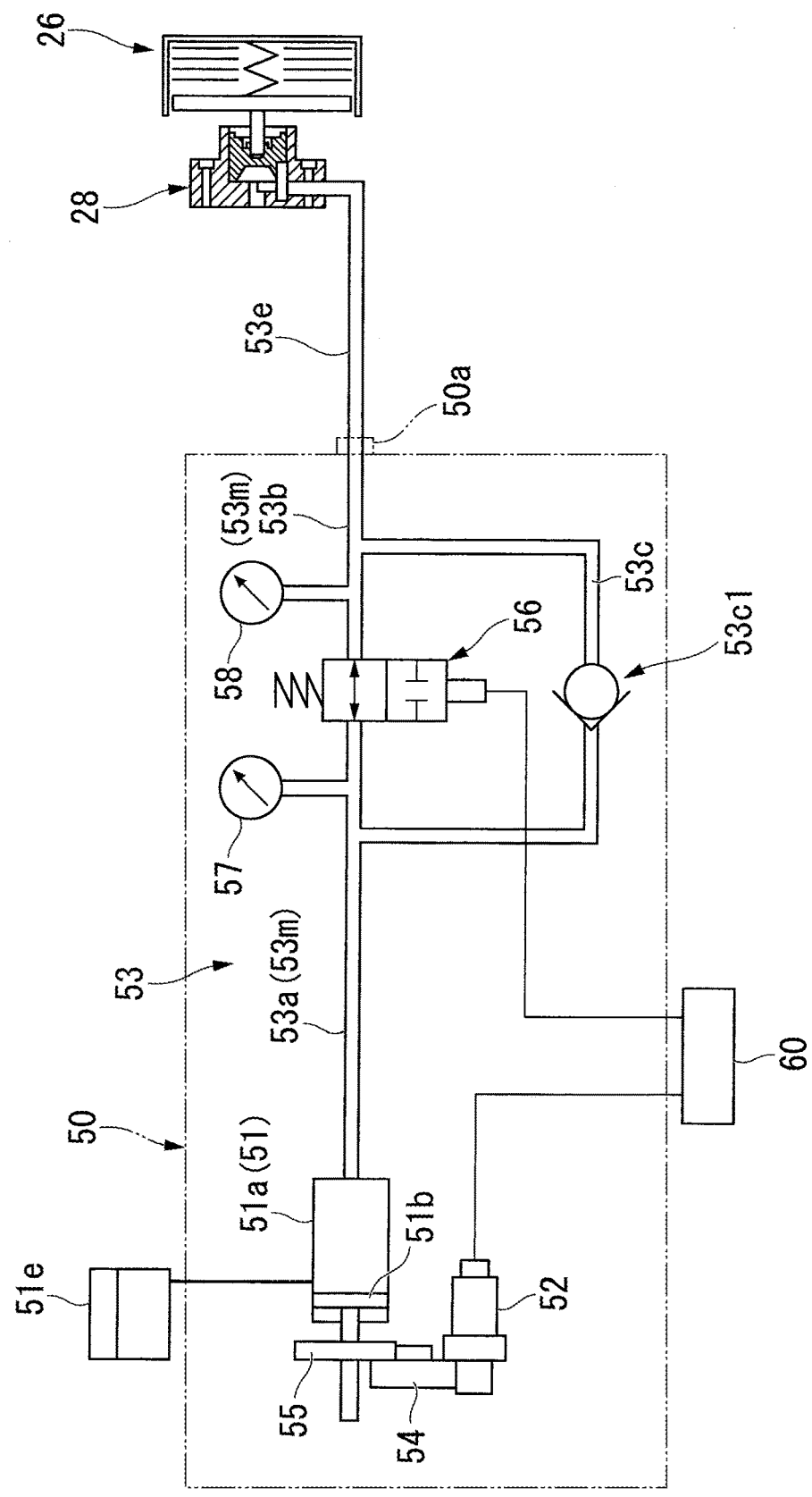
FIG. 3 is a view for schematically describing a clutch operating system including a clutch actuator.

Referring also to FIG. 3, the main shaft 22 and the counter shaft 23 of the gearbox 21 are disposed behind the crankshaft 14 to be arranged in the forward/rearward direction. A clutch 26 operated by a clutch actuator 50 is disposed coaxially with a right end portion of the main shaft 22. The clutch 26 is, for example, a multi-plate wet clutch, which is a so-called normal open clutch. That is, the clutch 26 is in a connected state in which power transmission is made possible by supply of a hydraulic pressure from the clutch actuator 50, and returns to a cut state in which power transmission is impossible when no hydraulic pressure from the clutch actuator 50 is supplied.

Referring to FIG. 2, rotary power of the crankshaft 14 is transmitted to the main shaft 22 via the clutch 26 and transmitted to the counter shaft 23 from the main shaft 22 via an arbitrary gear pair of the shifting gear group 24. A drive sprocket 27 of the chain type transmission mechanism is attached to a left end portion of the counter shaft 23 protruding toward a left side of a rear section of the crank case 15.

A change mechanism 25 configured to change a gear pair of the shifting gear group 24 is accommodated in the gearbox 21 on a rear upper side thereof. The change mechanism 25 operates a plurality of shift forks 37 according to a pattern of a lead groove formed on an outer circumference thereof due to rotation of a hollow cylindrical shift drum 36 parallel to both of the shafts 22 and 23, and changes a gear pair using power transmission between the shafts 22 and 23 in the shifting gear group 24.

The change mechanism 25 has a shift spindle 31 parallel to the shift drum 36. During pivotal movement of the shift spindle 31, a shift arm 31a fixed to the shift spindle 31 rotates the shift drum 36, moves the shift forks 37 in the axial direction according to a pattern of the lead groove, and changes a gear pair that enables power transmission in the shifting gear group 24 (i.e., changes a shifting stage).

The shift spindle 31 causes an outer shaft section 31b to protrude outward (toward a left side) from the crank case 15 in the vehicle width direction so that the change mechanism 25 can be operated. A shift load sensor 42 (a shift operation detection means) is attached coaxially to the outer shaft section 31b of the shift spindle 31 (see FIG. 1). A swing lever 33 is attached to the outer shaft section 31b of the shift spindle 31 (or a pivot shaft of the shift load sensor 42). The swing lever 33 extends rearward from a base end portion 33a fixed to the shift spindle 31 (or the pivot shaft) by a clamp, and an upper end portion of a link rod 34 (a connecting member) is swingably connected to a tip portion 33b thereof via an upper ball joint 34a (a connecting section). A lower end portion of the link rod 34 is swingably connected to a shift pedal 32 (a shifting pedal) operated by a driver's foot via a lower ball joint (not shown).

As shown in FIG. 1, a front end portion of the shift pedal 32 is vertically swingably supported by a lower section of the crank case 15 via a shaft in the leftward/rightward direction. A pedal section on which a driver's foot placed on a step 32a is put is formed on a rear end portion of the shift pedal 32, and a lower end portion of the link rod 34 is connected to an intermediate section of the shift pedal 32 in the forward/rearward direction.

As shown in FIG. 2, a shift change apparatus 35 including the shift pedal 32, the link rod 34 and the change mechanism 25 and configured to change a shifting stage gear of the gearbox 21 is provided. In the shift change apparatus 35, an assembly (the shift drum 36, the shift forks 37, and so on) configured to change a shifting stage of the gearbox 21 in the gearbox case 17 is referred to as a shift operation section 35a, and an assembly (the shift spindle 31, the shift arm 31a, and so on) configured to pivot the shift spindle 31 into which a shift operation to the shift pedal 32 is input around the axis thereof and transmit the pivotal movement to the shift operation section 35a is referred to as a shifting operation receiving section 35b.

Here, the motorcycle 1 employs a so-called semi-automatic gear shift system in which only a shifting operation of the gearbox 21 (a foot operation of the shift pedal 32) is performed by a driver, and a cutting and connecting operation of the clutch 26 is automatically performed by electric control according to an operation of the shift pedal 32.

Figure 4:
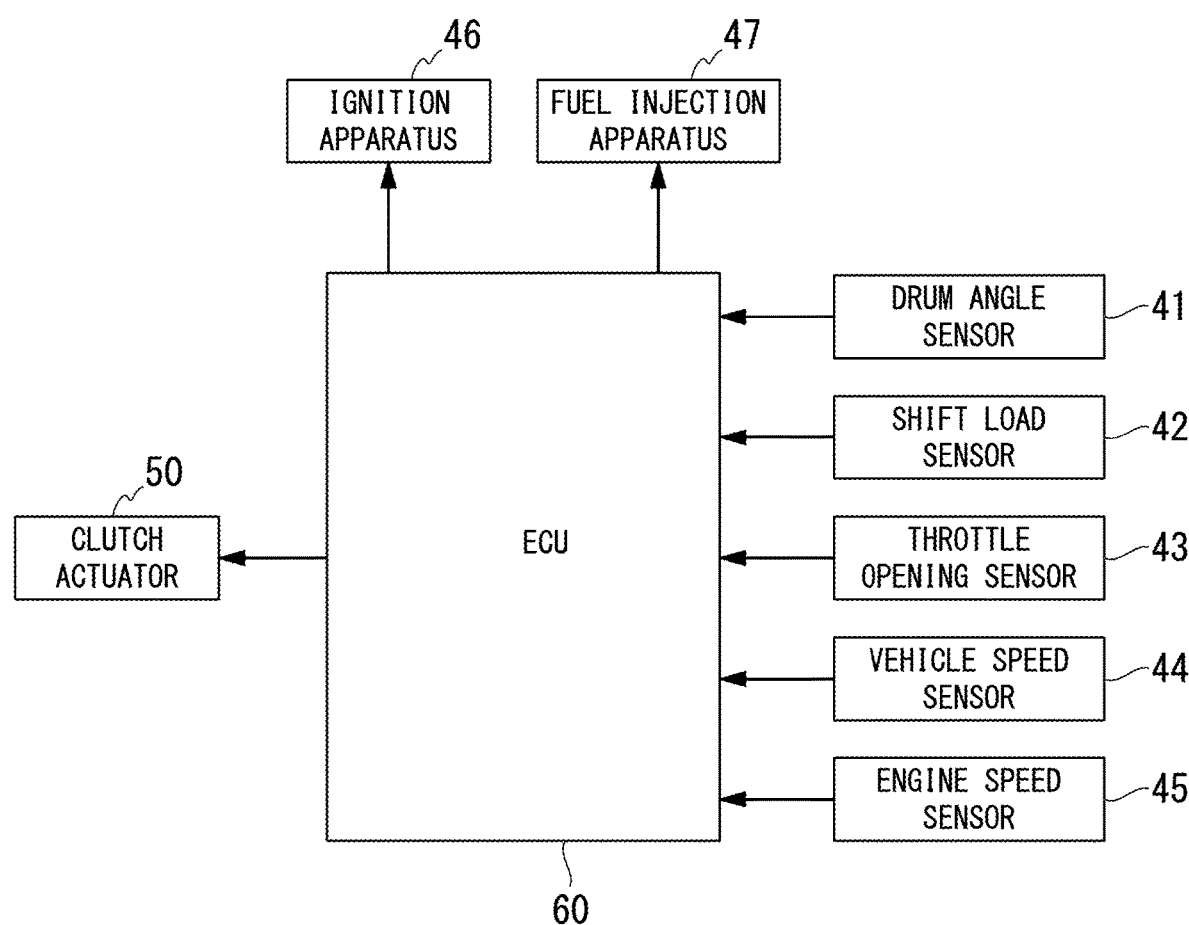
FIG. 4 is a block diagram of a shifting system.

As shown in FIG. 4, the gear shift system includes the clutch actuator 50, an electronic control unit (ECU, a control unit) 60 and various sensors 41 to 45.

The ECU 60 controls operations of an ignition apparatus 46 and a fuel injection apparatus 47 while controlling an operation of the clutch actuator 50 on the basis of detection information from a drum angle sensor (a gear position sensor) 41 configured to detect a shifting unit from a pivot angle of the shift drum 36 and a shift load sensor (a torque sensor) 42 configured to detect an operating torque input into the shift spindle 31 and detection information of various vehicle states from a throttle opening sensor 43, a vehicle speed sensor 44, an engine speed sensor 45, and so on. Detection information from hydraulic pressure sensors 57 and 58 of the clutch actuator 50 is also input into the ECU 60.

Referring also to FIG. 3, the clutch actuator 50 can control a liquid pressure that cuts and connects the clutch 26 as the clutch actuator 50 is operated by the ECU 60. The clutch actuator 50 includes an electric motor 52 serving as a drive source (hereinafter, simply referred to as the motor 52), a master cylinder 51 (a hydraulic pressure generating mechanism) driven by the motor 52, and an oil path forming section 53 installed between the master cylinder 51 and a hydraulic pressure supply/discharge port 50a.

The master cylinder 51 strokes a piston 51b in a cylinder main body 51a by driving the motor 52, and can supply and discharge a working fluid in the cylinder main body 51a into/from a slave cylinder 28. Reference numeral 51e in the drawing designates a reservoir connected to the master cylinder 51.

The oil path forming section 53 has a valve mechanism (a solenoid valve 56) configured to open or block an intermediate area of a main oil path 53m from the master cylinder 51 toward the clutch 26 (the slave cylinder 28). The main oil path 53m of the oil path forming section 53 is divided into an upstream side oil path 53a closer to the master cylinder 51 than the solenoid valve 56 and a downstream side oil path 53b closer to the slave cylinder 28 than the solenoid valve 56. The oil path forming section 53 further includes a bypass oil path 53c that bypasses the solenoid valve 56 and brings the upstream side oil path 53a and the downstream side oil path 53b in communication with each other.

The solenoid valve 56 is a so-called normal open valve. A one-way valve 53c1 configured to cause a working fluid to flow in only one direction from an upstream side toward a downstream side is installed in the bypass oil path 53c. An upstream side hydraulic pressure sensor 57 configured to detect a hydraulic pressure of the upstream side oil path 53a is installed upstream from the solenoid valve 56. A downstream side hydraulic pressure sensor 58 configured to detect a hydraulic pressure of the downstream side oil path 53b is installed downstream from the solenoid valve 56.

As shown in FIG. 1, the clutch actuator 50 is accommodated in, for example, the rear cowl 9a. The slave cylinder 28 is attached to a rear section of the crank case 15 on the left side. The clutch actuator 50 and the slave cylinder 28 are connected to each other via a hydraulic pressure pipeline 53e (see FIG. 3).

As shown in FIG. 2, the slave cylinder 28 is disposed coaxially with the main shaft 22 on the left side. The slave cylinder 28 presses a push rod 28a passing through the main shaft 22 rightward when a hydraulic pressure from the clutch actuator 50 is supplied. The slave cylinder 28 actuates the clutch 26 to a connected state via the push rod 28a by pressing the push rod 28a rightward. The slave cylinder 28 releases the pressing against the push rod 28a and returns the clutch 26 to a disconnected state when no hydraulic pressure is supplied.

While a hydraulic pressure should be continuously supplied to maintain the clutch 26 in the connected state, electric power is consumed to that extent. Here, as shown in FIG. 3, the solenoid valve 56 is installed in the oil path forming section 53 of the clutch actuator 50, and the solenoid valve 56 is closed after supply of the hydraulic pressure toward the clutch 26. Accordingly, a configuration for maintaining the hydraulic pressure supplied toward the clutch 26 and supplementing a hydraulic pressure to an extent of a decrease in pressure (recharging the hydraulic pressure to an extent of leakage) is provided, and energy consumption is suppressed.

Figure 5:
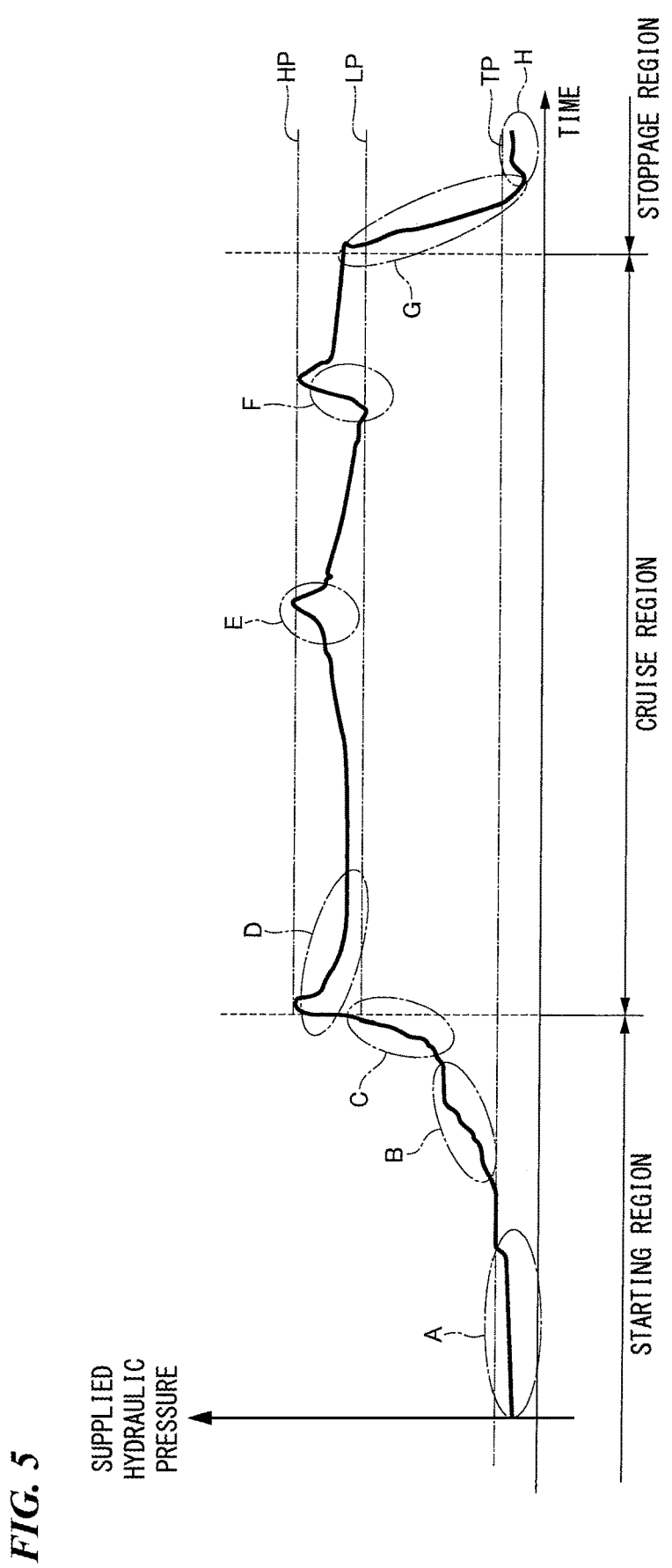
FIG. 5 is a graph showing variation in supplied hydraulic pressure of the clutch actuator.

Next, an action of the clutch control system will be described with reference to a graph of FIG. 5. In the graph of FIG. 5, a vertical axis represents a supplied hydraulic pressure detected by the downstream side hydraulic pressure sensor 58, and a horizontal axis represents the passage of time.

During stoppage (idling) of the motorcycle 1, the motor 52 and the solenoid valve 56 controlled by the ECU 60 are in a state in which supply of electric power is disconnected. That is, the motor 52 is in a stopped state and the solenoid valve 56 is in an open state. Here, the slave cylinder 28 side (a downstream side) is in a low pressure state with pressure lower than a touch point hydraulic pressure TP, and the clutch 26 is in a disengaged state (a disconnected state, a released state). The state corresponds to a region A of FIG. 5.

During starting of the motorcycle 1, when a rotation number of the engine 13 is increased, electric power is supplied to the motor 52 only, a hydraulic pressure is supplied from the master cylinder 51 to the slave cylinder 28 via the solenoid valve 56 in the open state. When the hydraulic pressure on the side of the slave cylinder 28 (a downstream side) is increased to be higher than the touch point hydraulic pressure TP, engagement of the clutch 26 is started, and the clutch 26 is in a half clutch state in which some power can be transmitted. Accordingly, smooth starting of the motorcycle 1 becomes possible. This state corresponds to a region B of FIG. 5.

Then, when a hydraulic pressure on the side of the slave cylinder 28 (the downstream side) reaches a lower limit holding hydraulic pressure LP, engagement of the clutch 26 is completed, and a driving force of the engine 13 is entirely transmitted to the gearbox 21. This state corresponds to a region C of FIG. 5. The regions A to C are set as a starting region.

Then, when the hydraulic pressure on the side of the slave cylinder 28 (the downstream side) reaches an upper limit holding hydraulic pressure HP, supply of electric power to the motor 52 is stopped and generation of a hydraulic pressure is stopped while electric power is supplied to the solenoid valve 56 and the solenoid valve 56 is closed. That is, while the upstream side is in a low pressure state as the hydraulic pressure is released, the downstream side is maintained in a high pressure state (the upper limit holding hydraulic pressure HP). Accordingly, the clutch 26 can be maintained in an engaged state without generation of a hydraulic pressure by the master cylinder 51, and electric power consumption can be suppressed while traveling of the motorcycle 1 is possible.

Even in a state in which the solenoid valve 56 is closed, due to hydraulic pressure leakage or a decrease in temperature caused by deformation of seals of the solenoid valve 56 and the one way valve 53c1, as shown in a region D of FIG. 5, a hydraulic pressure on the downstream side is gradually decreased (leaks). Meanwhile, as shown in a region E of FIG. 5, a hydraulic pressure on the downstream side may be increased due to an increase in temperature or the like. A slight variation in hydraulic pressure on the downstream side can be absorbed by an accumulator (not shown) included in the clutch actuator 50, and thus electric power consumption due to operations of the motor 52 and the solenoid valve 56 does not increase with every variation in hydraulic pressure.

As shown in the region E of FIG. 5, when the hydraulic pressure on the downstream side is increased to the upper limit holding hydraulic pressure HP, the solenoid valve 56 is opened step by step, and the hydraulic pressure on the downstream side is relieved to the upstream side by decreasing supply of electric power to the solenoid valve 56.

As shown in a region F of FIG. 5, when the hydraulic pressure on the downstream side is decreased to the lower limit holding hydraulic pressure LP, supply of electric power to the motor 52 is started while the solenoid valve 56 is closed, and the hydraulic pressure on the upstream side is increased. When the hydraulic pressure on the upstream side is higher than the hydraulic pressure on the downstream side, the hydraulic pressure is supplemented (recharged) to the downstream side via the bypass oil path 53c and the one way valve 53c1. When the hydraulic pressure on the downstream side reaches the upper limit holding hydraulic pressure HP, supply of electric power to the motor 52 is stopped and generation of a hydraulic pressure is stopped. Accordingly, the hydraulic pressure on the downstream side is maintained between the upper limit holding hydraulic pressure HP and the lower limit holding hydraulic pressure LP, and the clutch 26 is maintained in an engaged state. The regions D to F are set as a cruise region.

During stoppage of the motorcycle 1, supply of electric power to the motor 52 and the solenoid valve 56 is also stopped. Accordingly, the master cylinder 51 stops generation of a hydraulic pressure and stops supply of a hydraulic pressure to the slave cylinder 28. The solenoid valve 56 is in an open state, and a hydraulic pressure in the downstream side oil path 53b is returned to the reservoir 51e. Accordingly, the slave cylinder 28 side (the downstream side) is in a low pressure state with pressure lower than the touch point hydraulic pressure TP, and the clutch 26 is in a disengaged state. This state corresponds to regions G and H of FIG. 5. The regions G and H are set as a stoppage region.

Hereinafter, the shift load sensor 42 (a shift operation detecting means) will be described in detail.

Figure 6:
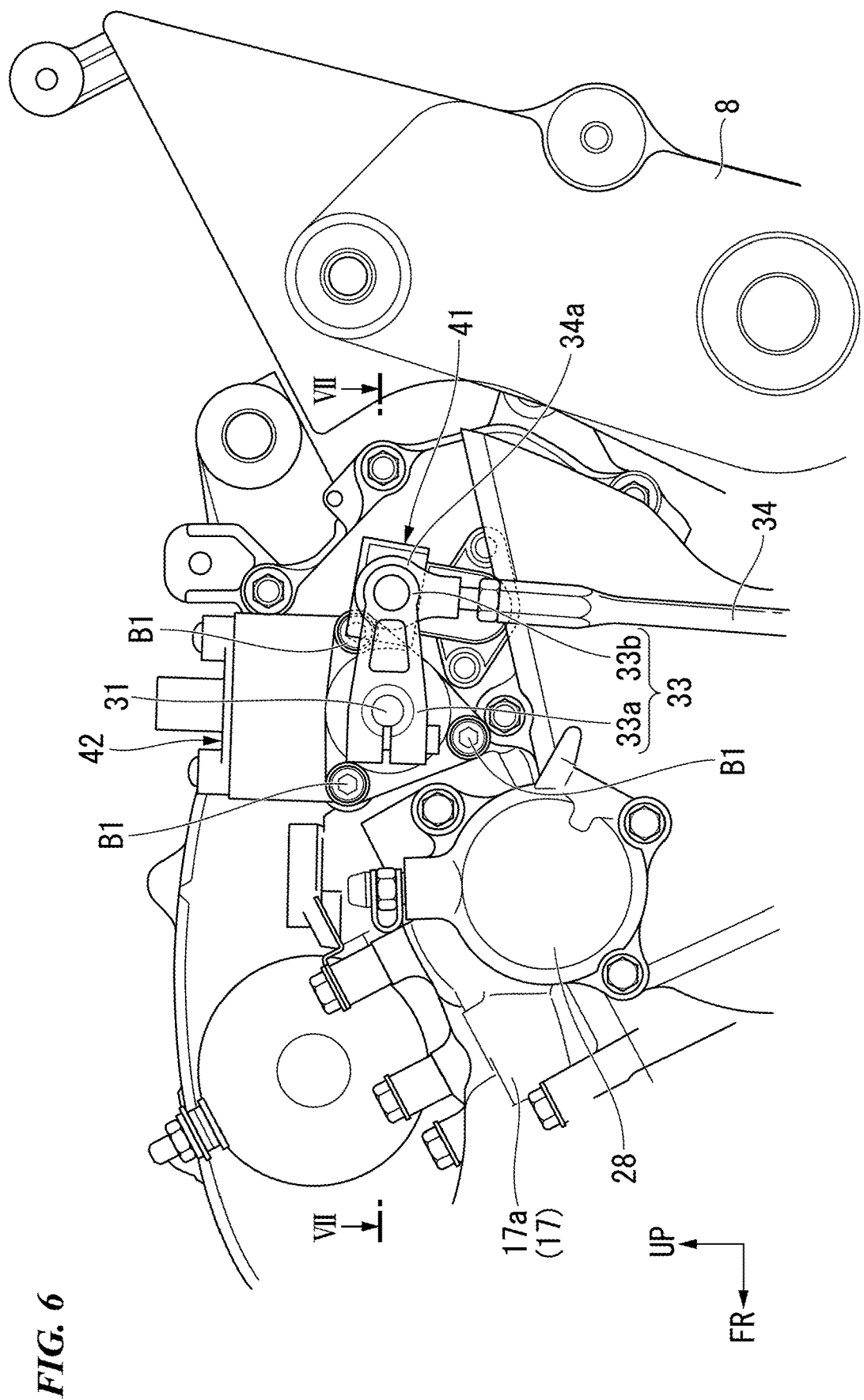
FIG. 6 is a left side view of surroundings of a shift load sensor of a first embodiment.
Figure 7:
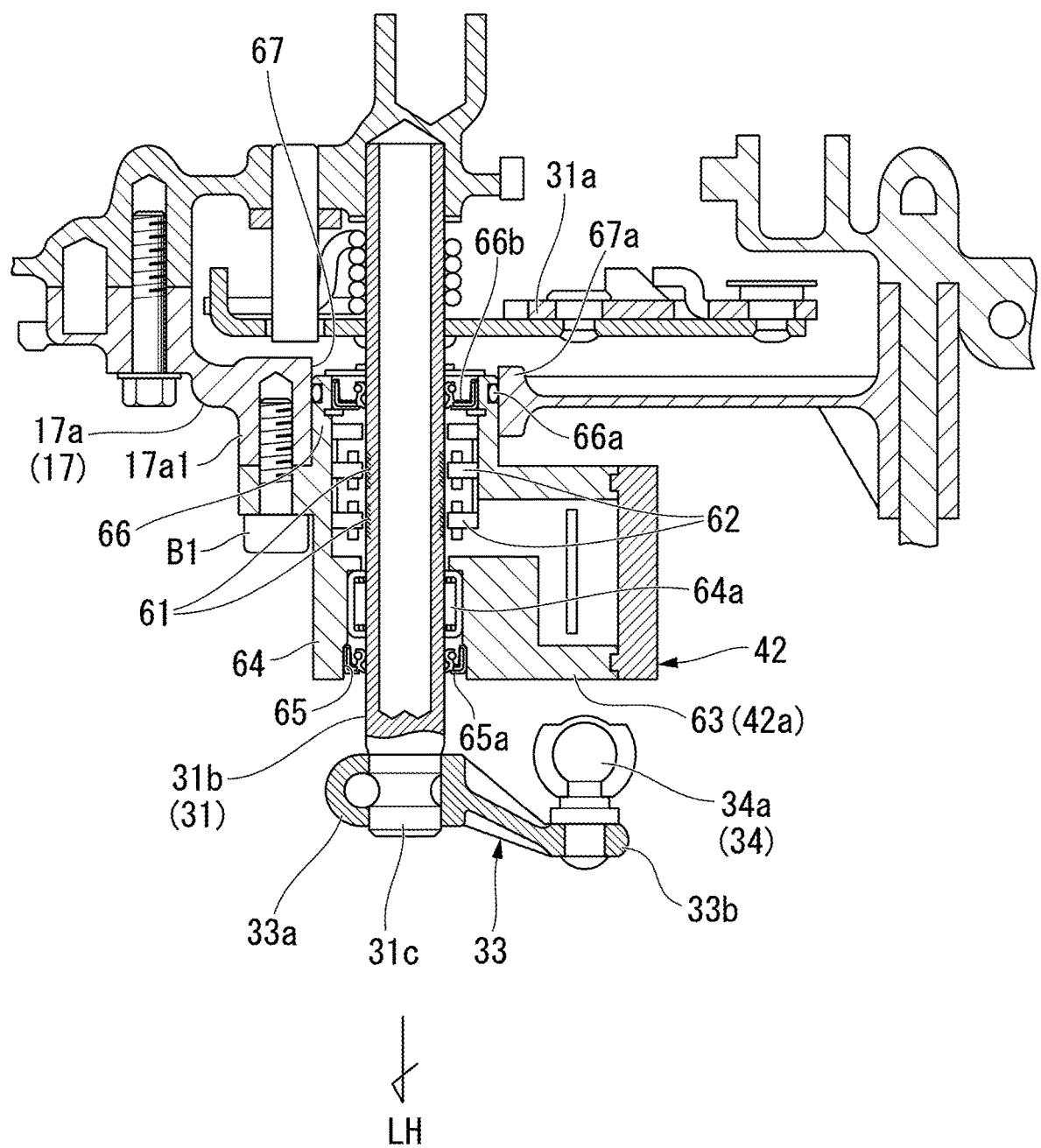
FIG. 7 is a cross-sectional view taken along line VII-VII of FIG. 6.

As shown in FIG. 6 and FIG. 7, the shift load sensor 42 is attached to a portion of an outer wall 17a of the gearbox case 17, at which the outer shaft section 31b of the shift spindle 31 protrudes toward the outside in the vehicle width direction, from the outside in the vehicle width direction in a state in which the outer shaft section 31b passes therethrough. The shift load sensor 42 is disposed between the swing lever 33 fixed to a tip portion (a clamp fixing section 31c) of the outer shaft section 31b outside in the vehicle width direction by a clamp and the outer wall 17a of the gearbox case 17. A drum angle sensor 41 is attached to an area of the outer wall 17a of the gearbox case 17 behind the shift load sensor 42.

The shift load sensor 42 is a so-called magneto-striction type torque sensor, and directly detects a pivotal operating torque input to the shift spindle 31. The shift load sensor 42 forms two magneto-strictive material fixing sections 61 arranged in a detection target area of the shift spindle 31 in the axial direction, and faces detection coils 62 (sensor units) outside the magneto-strictive material fixing sections 61 in the radial direction in a non-contact manner. The shift load sensor 42 can detect a variation in magnetic field generated in the magneto-strictive material fixing sections 61 from a variation in induced electromotive force generated in the detection coils 62 and can detect a torque (a shifting operation load) input to the shift spindle 31 when a torque is applied to the shift spindle 31.

Both of the detection coils 62 are accommodated in a sensor case 63 through which the shift spindle 31 passes. Hereinafter, an assembly including the detection coils 62 and the sensor case 63 is referred to as a sensor main body 62a. The sensor case 63 (a sensor main body 42a) is fixed to a fixing boss 17a1 protruding from the outer wall 17a of the gearbox case 17 by a bolt B1. A shaft receiving section 64 configured to rotatably support the shift spindle 31 is installed outside the sensor case 63 in the vehicle width direction. The shaft receiving section 64 supports the shift spindle 31 via a needle bearing 64a. As the outer shaft section 31b is supported in the shaft receiving section 64 of the sensor case 63, the shift spindle 31 having an increased axial length is stably supported. An outer opening section 65 (an opening) having an increased diameter with respect to the shaft receiving section 64 is formed in the sensor case 63 outside the shaft receiving section 64 in the vehicle width direction. A dust seal 65a (a shaft outer circumference seal member) configured to seal a space between an inner circumferential surface of the outer opening section 65 and an outer circumferential surface of the shift spindle 31 is fitted into an inner circumference of the outer opening section 65. The dust seal 65a prevents foreign substances such as dust or the like outside the vehicle from reaching the detection coils 62.

A fitting protrusion 66 protruding toward the outer wall 17a of the gearbox case 17 is formed on an end portion of the sensor case 63 on the side of the gearbox case 17. A through-hole 67 through which the shift spindle 31 passes with a gap therebetween is formed in the outer wall 17a. The fitting protrusion 66 is formed in a tubular shape through which the shift spindle 31 passes with a gap therebetween, and is fitted into the through-hole 67 from the outside in the vehicle width direction. The through-hole 67 is formed in a circular shape coaxial with the shift spindle 31. The fitting protrusion 66 is formed in a cylindrical shape coaxial with the shift spindle 31. A collar section 67a having a width larger than that of the outer wall 17a in a thickness direction (a vehicle width direction) of the outer wall 17a is formed in a circumferential edge of the through-hole 67. An O-ring 66a (an insertion section seal member) held in a fitting groove of an outer circumferential surface of the fitting protrusion 66 comes in close contact with an inner circumferential surface of the collar section 67a. An inner diameter of the outer opening section 65 of the sensor case 63 is smaller than an inner diameter of the collar section 67a (an inner diameter of the through-hole 67). That is, since an opening thereof sealed by the seal member is small, intrusion of foreign substances outside the vehicle is easily prevented.

An oil seal 66b (a shaft outer circumference seal member) configured to seal a space between an inner circumferential surface of the fitting protrusion 66 and an outer circumferential surface of the shift spindle 31 is fitted into the inner circumference of the fitting protrusion 66 of the sensor case 63. That is, seal members (the dust seal 65a, the oil seal 66b) configured to seal a space between an outer circumferential surface of the shift spindle 31 and an inner circumferential surface of the sensor case 63 are installed at both sides of the shift spindle 31 with both of the detection coils 62 sandwiched therebetween in the axial direction. The oil seal 66b prevents engine oil in the gearbox case 17 from reaching the detection coils 62.

The swing lever 33 is offset with respect to the base end portion 33a coupled to the shift spindle 31 at a side where the tip portion 33b to which the link rod 34 is connected is separated from the gearbox case 17 (outside in the vehicle width direction). The upper end portion (the upper ball joint 34a) of the link rod 34 is connected to the tip portion 33b of the swing lever 33 from the gearbox case 17 side. The connecting section (the upper ball joint 34a) of the link rod 34 with respect to the swing lever 33 is disposed between the tip portion 33b of the swing lever 33 and the shift load sensor 42 in the vehicle width direction.

Figure 8:
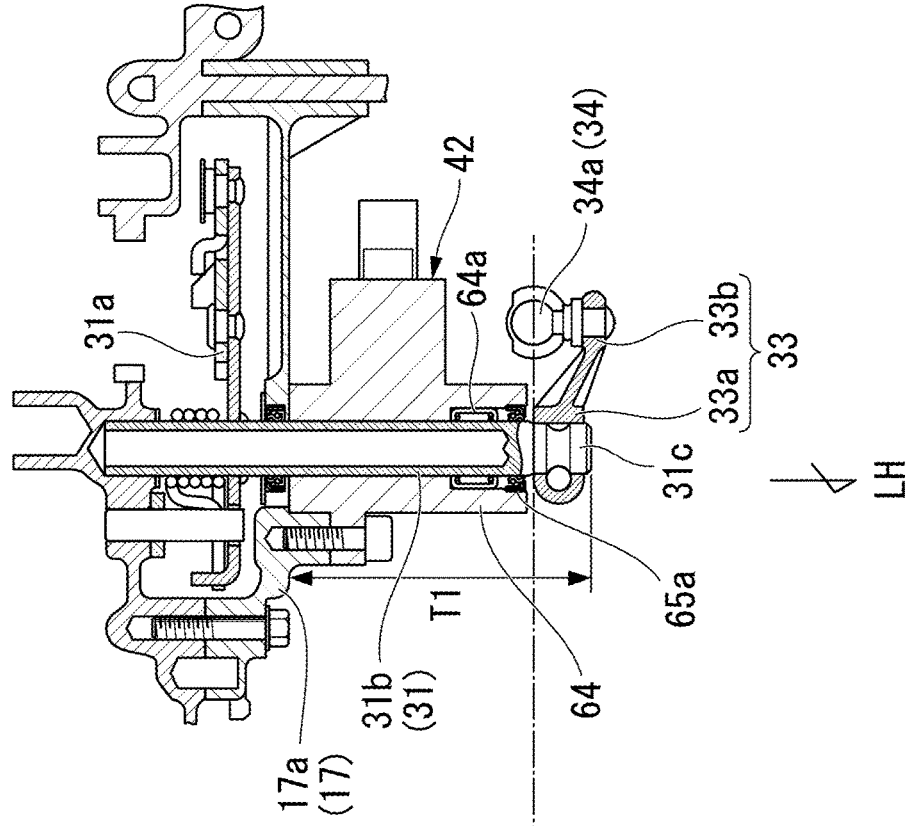
FIG. 8 is a cross-sectional view corresponding to FIG. 7 showing a result of comparison of a comparative example and the embodiment.
Figure 8:
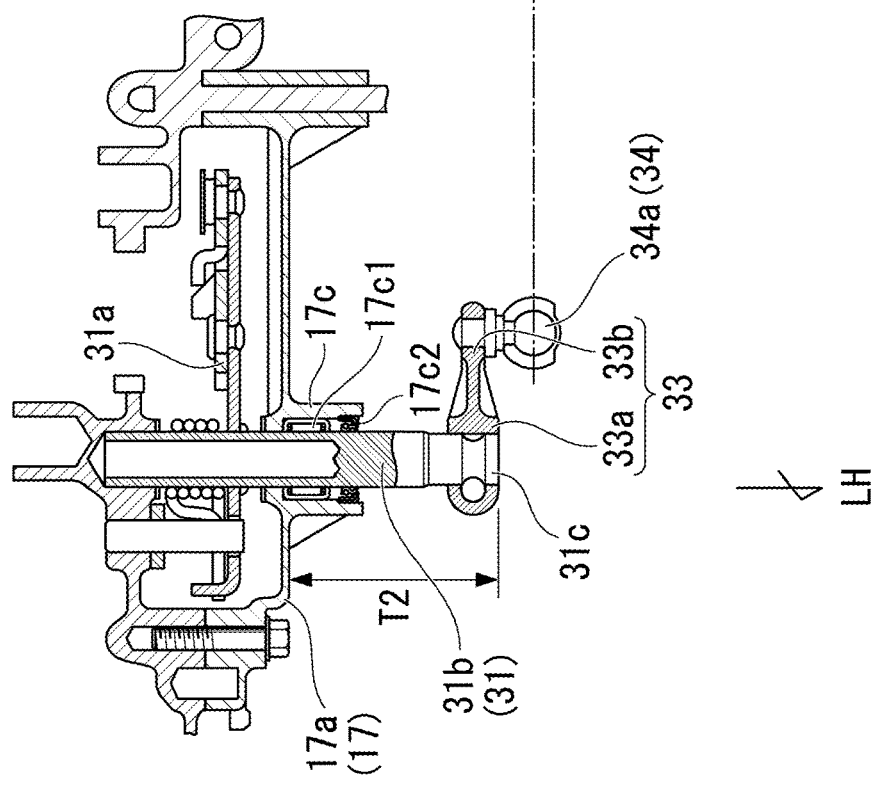

In a comparative example shown at a left side in FIG. 8, the shift load sensor 42 is not provided, and a protrusion amount T2 of the outer shaft section 31b of the shift spindle 31 from the outer wall 17a of the gearbox case 17 is smaller than a protrusion amount T1 of the embodiment shown at a right side in FIG. 8. In the comparative example, the outer shaft section 31b of the shift spindle 31 is supported by a shaft receiving section 17c of the outer wall 17a of the gearbox case 17 via a needle bearing 17c1. A dust seal 17c2 is fitted into the shaft receiving section 17c outside in the vehicle width direction.

In the comparative example, in the swing lever 33 fixed to the tip portion (the clamp fixing section 31c) of the shift spindle 31, the base end portion 33a and the tip portion 33b are not offset in the vehicle width direction, and the upper ball joint 34a of the link rod 34 is connected to the tip portion 33b from the outside in the vehicle width direction (an opposite side of the gearbox case 17).

In the embodiment, an axial length of the outer shaft section 31b of the shift spindle 31 is increased by an extent due to disposition of the shift load sensor 42, and the swing lever 33 coupled to the tip portion (the clamp fixing section 31c) of the outer shaft section 31b is displaced outward in the vehicle width direction to that extent. When the link rod 34 is connected to the tip portion 33b of the swing lever 33 from the outside in the vehicle width direction, since displacement outward in the vehicle width direction is also needed in the link rod 34 and the shift pedal 32, a vehicle width around a driver's foot is increased which may affect operability or a foot resting property of foot shifting.

On the other hand, in the embodiment, since the link rod 34 is connected to the tip portion 33b of the swing lever 33 from the inside in the vehicle width direction (the gearbox case 17 side), an influence around the driver's foot in the vehicle width is minimized. In addition, in the swing lever 33, since the tip portion 33b is offset with respect to the base end portion 33a outside in the vehicle width direction (an opposite side to the gearbox case 17), a space between the tip portion 33b and the gearbox case 17 is widened, and the upper ball joint 34a of the link rod 34 is easily disposed inside the tip portion 33b in the vehicle width direction (the gearbox case 17 side). In addition, a position of the upper ball joint 34a in the vehicle width direction can be set to the same as in the comparative example by setting an offset amount between the base end portion 33a and the tip portion 33b, and diversion of the connecting parts such as the link rod 34, the shift pedal 32, and so on, becomes easy.

As described above, the shifting operation detecting apparatus according to the embodiment includes the gearbox 21 accommodated in the gearbox case 17 and configured to transmit and output a driving force received in the main shaft 22 from the engine 13 to the counter shaft 23 via some shifting gears of the shifting gear group 24 having a plurality of stages, and the shift change apparatus 35 including the shift pedal 32 that receives a shifting operation by a foot operation of a driver and configured to change a shifting gear of the gearbox 21, the shift change apparatus 35 includes the shifting operation unit 35a (the shift drum 36 and the shift forks 37) accommodated in the gearbox case 17 and configured to change a shifting gear of the gearbox 21, the shifting operation receiving section 35b (the shift spindle 31 and the shift arm 31a) having the outer shaft section 31b protruding toward the outside of the gearbox case 17, receiving a shifting operation by a foot operation of a driver to pivot around the shaft of the outer shaft section 31b and configured to transmit pivotal movement to the shifting operation unit 35a, the swing lever 33 pivotally integrated with the outer shaft section 31b of the shifting operation receiving section 35b, and the link rod 34 configured to connect the swing lever 33 and the shift pedal 32 such that they become interlocked, the shift load sensor 42 is disposed around the outer shaft section 31b of the shifting operation receiving section 35b and between the swing lever 33 and the gearbox case 17 to directly detect a pivoted state of the shifting operation receiving section 35b, and the link rod 34 is connected to the swing lever 33 from the gearbox case 17 side.

According to this configuration, in the shift change apparatus 35 configured to perform a shifting operation of the gearbox 21 using the shift pedal 32, while the outer shaft section 31b extends toward the outside of the gearbox case 17 when the shift load sensor 42 is disposed on the outer shaft section 31b of the shifting operation receiving section 35b, even in this case, since the link rod 34 that connects the swing lever 33 and the shift pedal 32 installed on the outer shaft section 31b is connected to the swing lever 33 from the gearbox case 17 side, even when the outer shaft section 31b extends due to disposition of the shift load sensor 42 to the outer shaft section 31b of the shifting operation receiving section 35b and the swing lever 33 is offset toward the outside of the gearbox case 17, the link rod 34 is disposed closer to the gearbox case 17 than the swing lever 33, and offsetting toward the outside of the shift pedal 32 can be made unnecessary. For this reason, the shift pedal 32 and the link rod 34 can be prevented from overhanging around a driver's foot in the vehicle width direction, and operability and a foot resting property of foot shifting can be appropriately maintained.

In addition, in the shifting operation detecting apparatus, the swing lever 33 is formed to be offset with respect to the base end portion 33a to which the shifting operation receiving section 35b is coupled at a side where the tip portion 33b to which the link rod 34 is connected is separated from the gearbox case 17, and the connecting section (the upper ball joint 34a) of the link rod 34 with respect to the swing lever 33 is disposed between the tip portion 33b of the swing lever 33 and the shift load sensor 42.

According to this configuration, as the tip portion 33b of the swing lever 33 is offset, a space is easily formed between the tip portion 33b and the shift load sensor 42 disposed closer to the gearbox case 17 than the swing lever 33, and the connecting section of the link rod 34 with respect to the swing lever 33 can be disposed in the space. For this reason, the link rod 34 can be prevented from overhanging in the vehicle width direction and can be disposed in a compact structure.

In addition, in the shifting operation detecting apparatus, at least a portion (the fitting protrusion 66) of the shift load sensor 42 is fitted into the gearbox case 17.

According to the configuration, since at least the portion of the shift load sensor 42 is fitted into the gearbox case 17, protrusion of the shift load sensor 42 in the vehicle width direction can be prevented, and miniaturization of the shifting operation receiving section 35b around the outer shaft section 31b can be achieved.

In addition, in the shifting operation detecting apparatus, at least the portion (the fitting protrusion 66) of the shift load sensor 42 is fitted into the through-hole 67 formed in the outer wall 17a of the gearbox case 17, and the collar section 67a having a width larger than that of the outer wall 17a in a thickness direction of the outer wall 17a is formed in the circumferential edge of the through-hole 67.

According to this configuration, as the collar section 67a having a width larger than that of the outer wall 17a is formed in the insertion section (the through-hole 67) of the outer wall 17a of the gearbox case 17, the shift load sensor 42 can be firmly fitted and held, and a positional deviation of the shifting operation receiving section 35b with respect to the outer shaft section 31b can be suppressed.

In addition, in the shifting operation detecting apparatus, the insertion section seal member (the O-ring 66a) is interposed between the inner circumferential surface of the collar section 67a and the outer circumferential surface of the fitting protrusion 66 fitted into the collar section 67a in the shift load sensor 42.

According to this configuration, as the insertion section seal member is interposed between the collar section 67a of the through-hole 67 of the gearbox case 17 and the fitting protrusion 66 of the shift load sensor 42, sealability of the through-hole 67 can be secured.

In addition, in the shifting operation detecting apparatus, the shift load sensor 42 has the sensor unit (the detection coil 62) installed on the outer circumference of the outer shaft section 31b of the shifting operation receiving section 35b and configured to detect pivotal movement of the outer shaft section 31b in a non-contact manner, and shaft outer circumference seal members (the dust seal 65a, the oil seal 66b) are interposed between the outer shaft section 31b and the shift load sensor 42 at both sides with the sensor units sandwiched therebetween in the axial direction of the outer shaft section 31*b*.

According to this configuration, when the sensor unit configured to detect pivotal movement of the outer shaft section 31*b* in a non-contact manner is used as the shift load sensor 42, as the shaft outer circumference seal members are interposed between the outer shaft section 31*b* and the shift load sensors 42 at both sides with the sensor units sandwiched therebetween, the sensor units can be prevented from being influenced by oil from the gearbox 21, foreign substances from outside of the vehicle, or the like, and the detection accuracy of the sensor unit can be secured.

In addition, in the shifting operation detecting apparatus, in the shift load sensor 42, a diameter of the opening (the outer opening section 65) through which the outer shaft section 31*b* of the shifting operation receiving section 35*b* passes is reduced at the outside in the vehicle width direction to farther than the outer wall 17*a* to be smaller than that of the through-hole 67 formed in the outer wall 17*a* of the gearbox case 17.

According to this configuration, since the outer diameter of the opening through which the outer shaft section 31*b* passes is smaller than that of the through-hole 67 of the outer wall 17*a* of the gearbox case 17 at the outside in the vehicle width direction to farther than the outer wall 17*a*, the intrusion path of foreign substances such as dust or the like from outside in the vehicle width direction can be narrowed, influences due to intrusion of the foreign substance can be suppressed, and the detection accuracy of the sensor unit can be secured.

In addition, in the shifting operation detecting apparatus, the shift load sensor 42 has the sensor case 63 fixed to the gearbox case 17, and the shaft receiving section 64 configured to rotatably support the outer shaft section 31*b* is installed in an area of the sensor case 63 through which the outer shaft section 31*b* passes.

According to the configuration, since the outer shaft section 31*b* of the shifting operation receiving section 35*b* extending for installation of the shift load sensor 42 is supported by the shaft receiving section 64 of the sensor case 63 of the shift load sensor 42, flexibility of the extended outer shaft section 31*b* can be effectively suppressed.

Second Embodiment

Figure 9:
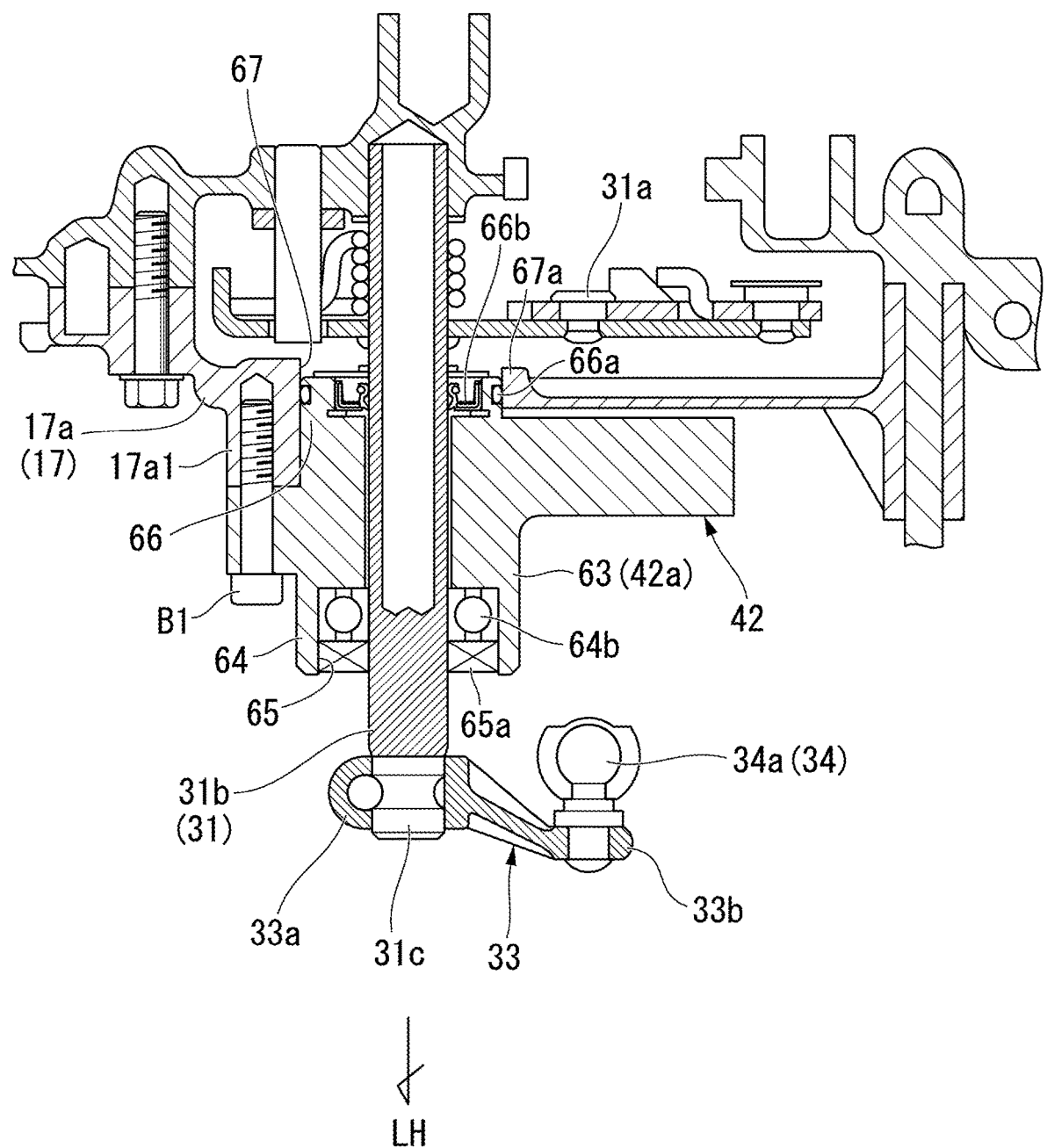
FIG. 9 is a cross-sectional view of a second embodiment corresponding to FIG. 6.

Next, a second embodiment of the present invention will be described with reference to FIG. 9.

The embodiment is distinguished from the first embodiment in that the shaft receiving section 64 of the sensor case 63 outside in the vehicle width direction supports the shift spindle 31 via a ball bearing 64*b*. In addition, components the same as in the first embodiment are designated by the same reference numerals and detailed description thereof will be omitted.

As the shaft receiving section 64 of the sensor case 63 supports the shift spindle 31 via the ball bearing 64*b*, a width of the shaft receiving section 64 in the axial direction is reduced in comparison with the first embodiment in which the shaft receiving section 64 supports the shift spindle 31 via the needle bearing 64*a*. Accordingly, the width of the sensor case 63, and consequently, the shift load sensor 42 in the axial direction can be reduced, and a compact structure around the shift spindle 31 can be achieved.

Third Embodiment

Figure 10:
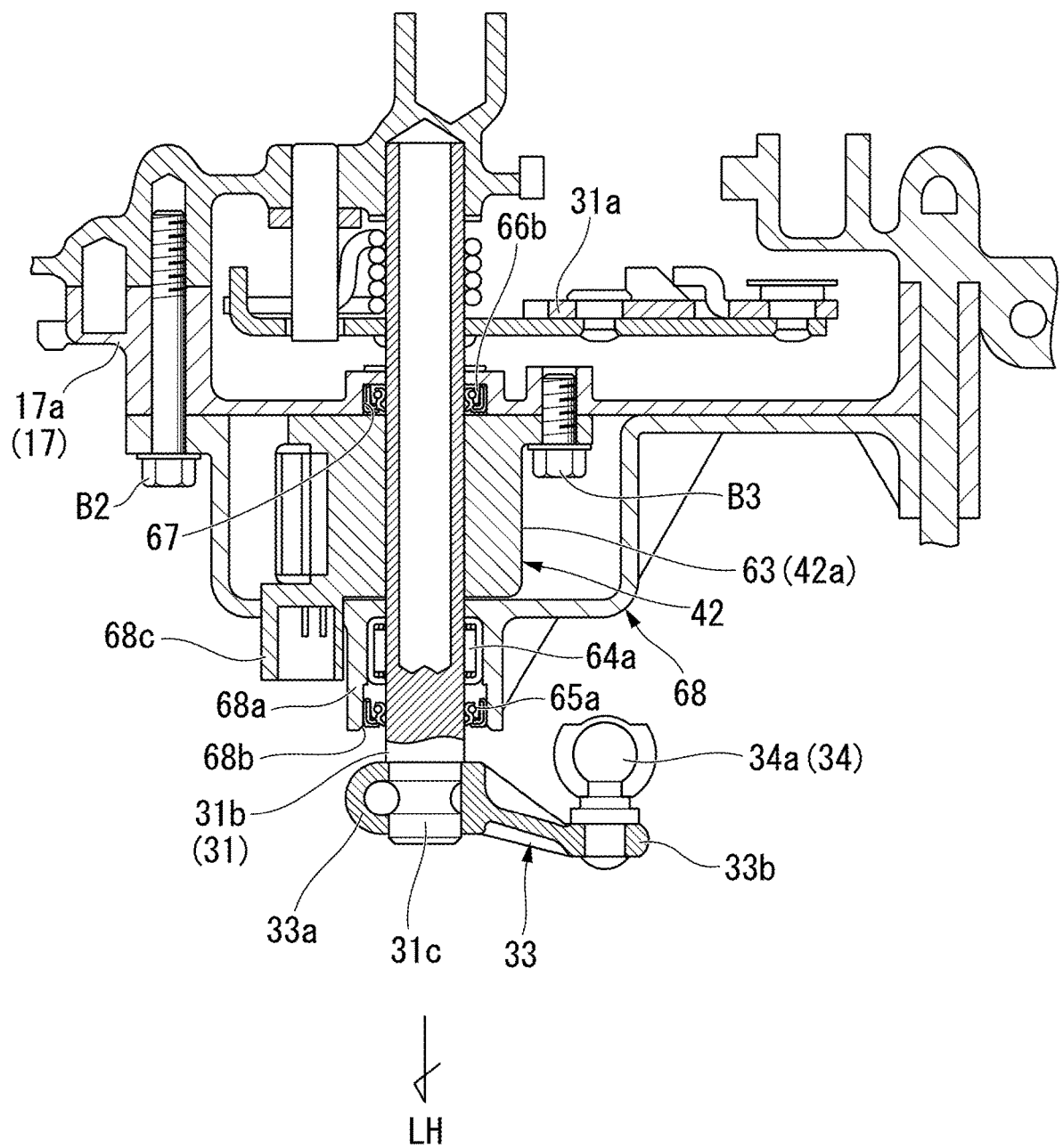
FIG. 10 is a cross-sectional view of a third embodiment corresponding to FIG. 6.

Next, a third embodiment of the present invention will be described with reference to FIG. 10.

The embodiment is distinguished from the first embodiment in that a cover member 68 configured to cover the shift load sensor 42 is attached to the outer wall 17*a* of the gearbox case 17. In addition, components the same as in the first embodiment are designated by the same reference numerals and detailed description thereof will be omitted.

The cover member 68 is detachably fixed to the outer wall 17*a* of the gearbox case 17 by a bolt B2 or the like. The shift load sensor 42 of FIG. 10 is fixed to the outer wall 17*a* by a bolt B3 or the like while abutting an outer surface of the outer wall 17*a* without providing the fitting protrusion 66. The oil seal 66*b* is fitted into the through-hole 67. Further, like the first embodiment, a configuration having the fitting protrusion 66 may be provided.

A shaft receiving section 68*a* that supports the shift spindle 31 is not formed in the shift load sensor 42 but formed in the cover member 68. The shift spindle 31 is supported in the shaft receiving section 68*a* of the cover member 68 via the needle bearing 64*a* (may be the ball bearing 64*b*). The dust seal 65*a* is fitted into an outer opening section 68*b* of the shaft receiving section 68*a* outside in the vehicle width direction. A feeding connector 68*c* of the shift load sensor 42 is disposed at one side of the shaft receiving section 68*a* on the outer circumferential side.

As the cover member 68 configured to cover the shift load sensor 42 is provided, intrusion of foreign substances outside the vehicle into and disturbance to the shift load sensor 42 can be effectively minimized. In addition, since the shift spindle 31 is supported by the shaft receiving section 68*a* of the cover member 68 separately from the shift load sensor 42, the influence of flexibility of the shift spindle 31 with respect to the shift load sensor 42 can be suppressed.

Fourth Embodiment

Figure 11:
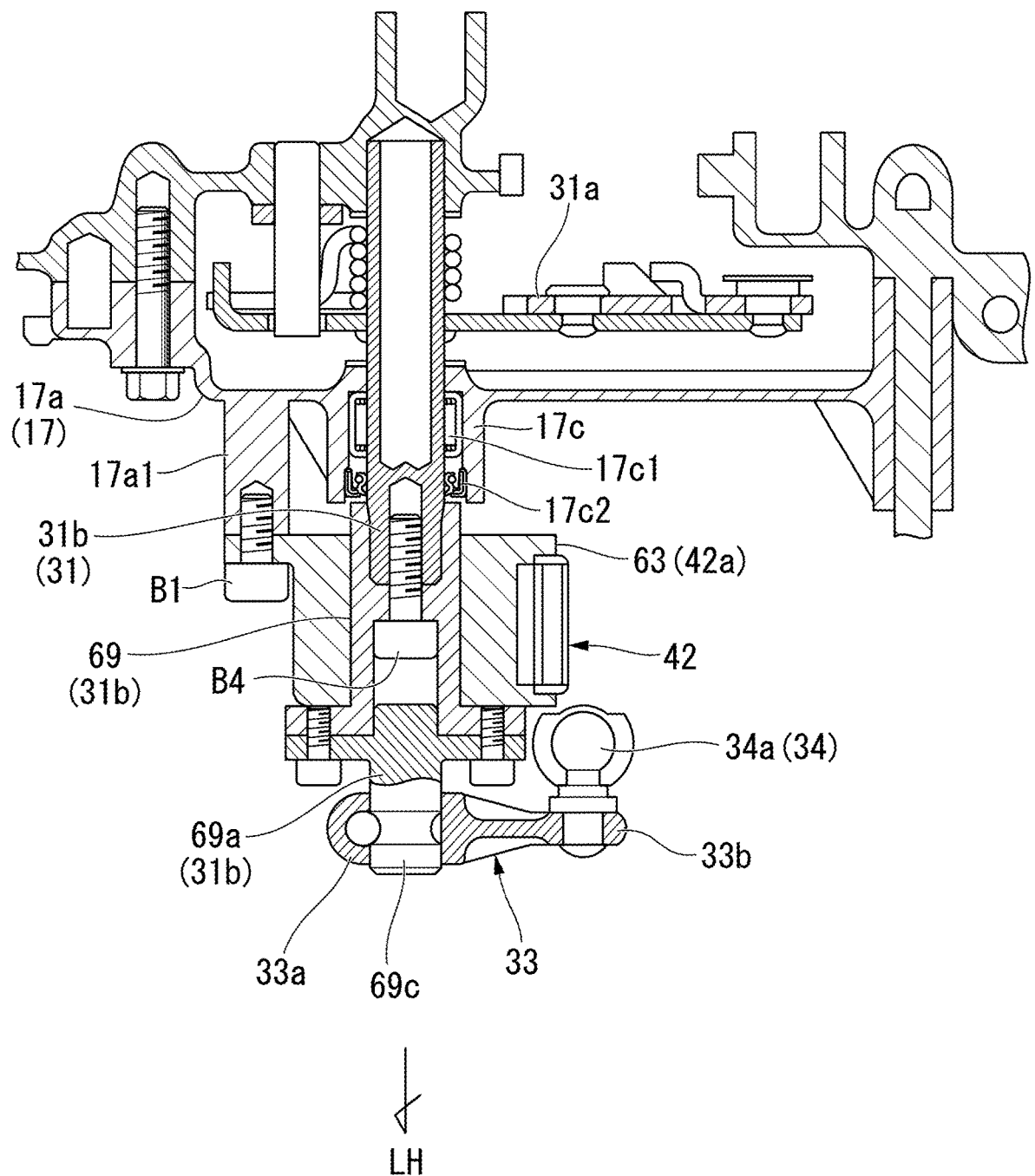
FIG. 11 is a cross-sectional view of a fourth embodiment corresponding to FIG. 6.

Next, a fourth embodiment of the present invention will be described with reference to FIG. 11.

The embodiment is distinguished from the first embodiment in that an axial length of the shift spindle 31 is reduced, an extension shaft 69 is fixed to the tip portion thereof, and the extension shaft 69 is inserted through the shift load sensor 42 as a detection target. In addition, components the same as in the first embodiment are designated by the same reference numerals and detailed description thereof will be omitted.

Like the comparative example of a left side in FIG. 8, the shift spindle 31 is supported in the shaft receiving section 17*c* of the gearbox case 17. The extension shaft 69 has a diameter larger than that of the shift spindle 31, and an end portion thereof inside in the vehicle width direction is fitted onto a tip portion of the shift spindle 31. The extension shaft 69 is integrally rotatably coupled to the shift spindle 31 by a bolt B4 inserted from the outside in the vehicle width direction. For example, the second extension shaft 69*a* having the same diameter as the shift spindle 31 is fixed to the extension shaft 69 outside in the vehicle width direction via a flange. A tip portion of the second extension shaft 69*a* is a clamp fixing section 69*c*, and the swing lever 33 is fixed to the clamp fixing section 69*c*. The extension shaft 69 and the second extension shaft 69*a* are included in the outer shaft section 31*b* of the shifting operation receiving section 35*b*.

As the extension shaft 69 is installed separately from the shift spindle 31, a conventional detection shaft in which the magneto-strictive material fixing section 61 is formed can be replaced with the extension shaft 69 and reduction in costs when the magneto-striction type torque sensor is employed as the shift load sensor 42 can be achieved. Further, the second extension shaft 69a may be eliminated and the corresponding part may be formed by the extension shaft 69. In addition, for the convenience of illustration, in FIG. 11, the offset between the base end portion 33a and the tip portion 33b of the swing lever 33 is eliminated. In addition, seal members (not shown) are fitted into both sides of the sensor main body 42a in the axial direction.

Fifth Embodiment

Figure 12:
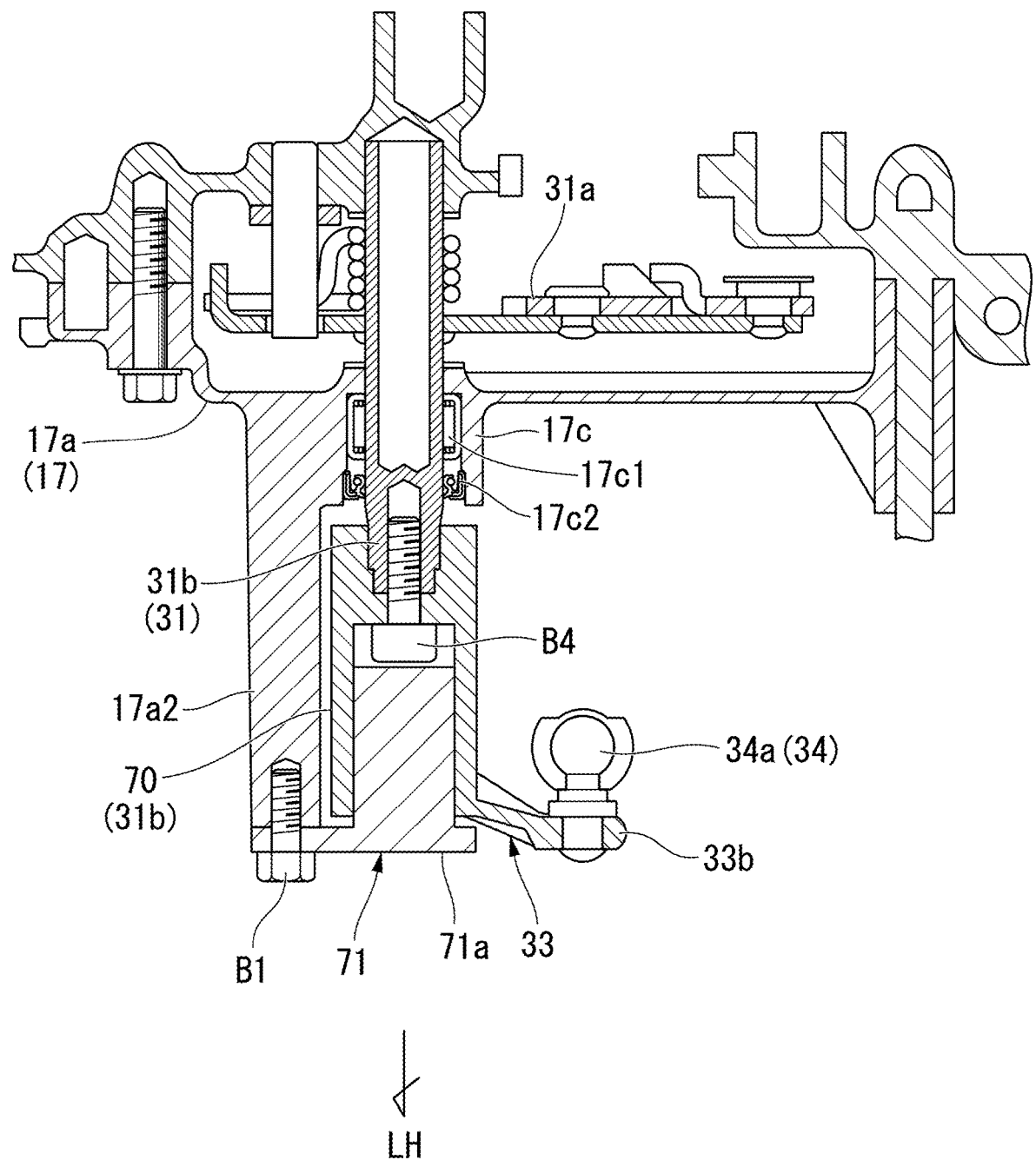
FIG. 12 is a cross-sectional view of a fifth embodiment corresponding to FIG. 6.

Next, a fifth embodiment of the present invention will be described with reference to FIG. 12.

The embodiment is distinguished from the first embodiment in that an axial length of the shift spindle 31 is reduced, an extension shaft 70 having a bottomed cylindrical shape and opening outward in the vehicle width direction is fixed to a tip portion thereof, a magneto-strictive material fixing section in a shift load sensor 71 is formed in an inner circumference of the extension shaft 70, and a sensor main body 71a including a sensor case and detection coil in the shift load sensor 71 is inserted into the extension shaft 70 from the outside in the vehicle width direction. In addition, components the same as in the first embodiment are designated by the same reference numerals and detailed description thereof will be omitted.

Like the comparative example of the left side in FIG. 8, the shift spindle 31 is supported in the shaft receiving section 17c of the gearbox case 17. The extension shaft 70 has a diameter larger than that of the shift spindle 31 and an end portion thereof inside in the vehicle width direction is fitted onto the tip portion of the shift spindle 31. The extension shaft 70 is integrally rotatably coupled to the shift spindle 31 by the bolt B4 inserted from the outside in the vehicle width direction. The shift load sensor 71 is fixed to an end of a support column 17a2 outside in the vehicle width direction protruding from the outer wall 17a of the gearbox case 17 by the bolt B1. A tip side of the swing lever 33 is integrally formed at one side of the extension shaft 70 outside in the vehicle width direction. A dust seal (not shown) is fitted into an opening section of the extension shaft 70 outside in the vehicle width direction. The extension shaft 70 is included in the outer shaft section 31b of the shifting operation receiving section 35b.

As the sensor main body 71a of the magneto-striction type torque sensor is inserted into the extension shaft 70, influence of disturbance to the sensor main body 71a can be suppressed.

Sixth Embodiment

Next, a sixth embodiment of the present invention will be described with reference to FIG. 13.

The embodiment is distinguished from the first embodiment in that an extension shaft 72 is fixed to a clamp fixing section 31c of a tip portion of the shift spindle 31 by a clamp, the extension shaft 72 is inserted through the shift load sensor 42 as a detection target, and the swing lever 33 is fixed to a second clamp fixing section 72a formed in the extension shaft 72 outside in the vehicle width direction. In addition, components the same as in the first embodiment are designated by the same reference numerals and detailed description thereof will be omitted.

Like the comparative example of the left side in FIG. 8, the shift spindle 31 is supported in the shaft receiving section 17c of the gearbox case 17. The shift spindle 31 can provide the same axial length and the same clamp fixing section 31c as the comparative example, and the conventional shift spindle 31 can be replaced to achieve reduction in costs.

Figure 13:
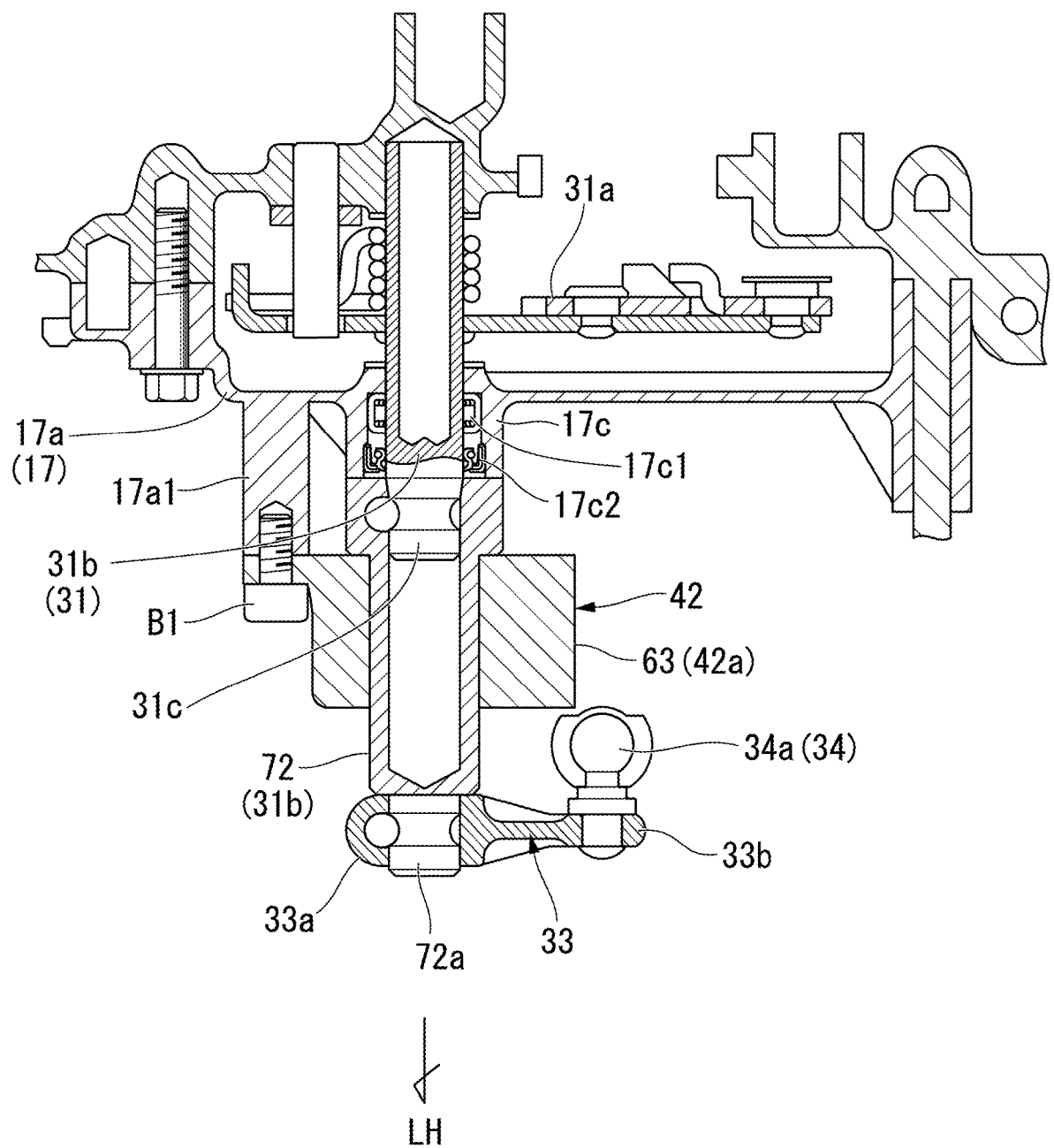
FIG. 13 is a cross-sectional view of a sixth embodiment corresponding to FIG. 6.

Further, for the convenience of illustration, in FIG. 13, offset between the base end portion 33a and the tip portion 33b of the swing lever 33 is eliminated. In addition, seal members (not shown) are fitted into both sides of the sensor main body 42a in the axial direction. The extension shaft 72 is included in the outer shaft section 31b of the shifting operation receiving section 35b.

Further, the present invention is not limited to these embodiments, and for example, a lost motion mechanism may be installed on the shift pedal 32, a shifting operation force (a pedal stroke force) input into the shift pedal 32 may be accumulated, the accumulated operation force may be released when a pedal stroke reaches a stroke amount that can be changed, and shifting may be performed by pivoting the shift spindle 31.

In this way, reliability of shift change and a feeling of a shift operation in the semi-automatic shifting system can be increased by releasing the accumulated force after the accumulated force reaches an extent capable of changing a shifting gear stage to the lost motion mechanism and pivoting the shift spindle 31.

In addition, it is possible to prevent the change mechanism 25 from operating unintentionally even with an unexpected external force (for example, when a driver operates the shift pedal 32 due to an unintentional contact with the shift pedal 32, or the like).

The present invention is not limited to a motorcycle and may be applied to a three-wheeled vehicle (including a two-front-wheeled and one-rear-wheeled vehicle in addition to a one-front-wheeled and two-rear-wheeled vehicle) or a four-wheeled vehicle.

The configuration of the embodiment is an example of the present invention. Various changes can be made to the embodiment, for example, the configuration elements in the embodiment are replaced with well-known configuration elements, insofar as the changes do not depart from the concept of the present invention.

What is claimed is:
1. A shifting operation detecting apparatus comprising:
a gearbox accommodated in a gearbox case and configured to transmit and output a driving force received in an input shaft from a drive source to an output shaft via any one shifting gear of a shifting gear group having a plurality of stages; and
a shift change apparatus including a shifting pedal that receives a shifting operation by a foot operation of a driver and configured to change the shifting gear of the gearbox,
the shift change apparatus comprising:
a shifting operation unit accommodated in the gearbox case and configured to change the shifting gear of the gearbox;
a shifting operation receiving section having an outer shaft section protruding outward from the gearbox case, receiving the shifting operation by the foot operation of the driver to pivot around a shaft of the outer shaft section and configured to transmit a pivotal movement to the shifting operation unit;
a swing lever integrally pivotably installed on the outer shaft section of the shifting operation receiving section; and
a connecting member configured to interlockably connect the swing lever and the shifting pedal,
wherein a shift operation detecting means is disposed between the swing lever and the gearbox case in the outer shaft section of the shifting operation receiving section to directly detect a pivoted state of the shifting operation receiving section, and the connecting member is connected to the swing lever from the gearbox case side.

2. The shifting operation detecting apparatus according to claim 1, wherein the swing lever is formed such that a tip portion to which the connecting member is connected is offset with respect to a base end portion to which the shifting operation receiving section is coupled at a side away from the gearbox case, and a connecting section of the connecting member with respect to the swing lever is disposed between the tip portion of the swing lever and the shift operation detecting means.

3. The shifting operation detecting apparatus according to claim 1, wherein at least a portion of the shift operation detecting means is fitted into the gearbox case.

4. The shifting operation detecting apparatus according to claim 1, wherein at least a portion of the shift operation detecting means is fitted into a through-hole formed in an outer wall of the gearbox case, and a collar section having a width larger than that of the outer wall is formed on a circumferential edge of the through-hole in a thickness direction of the outer wall.

5. The shifting operation detecting apparatus according to claim 4, wherein an insertion section seal member is interposed between an inner circumferential surface of the collar section and an outer circumferential surface of a fitting protrusion fitted into the collar section of the shift operation detecting means.

6. The shifting operation detecting apparatus according to claim 1, wherein the shift operation detecting means has a sensor unit installed on an outer circumference of the outer shaft section of the shifting operation receiving section and configured to detect pivotal movement of the outer shaft section in a non-contact manner, and shaft outer circumference seal members are interposed between the outer shaft section and the shift operation detecting means at both sides of the outer shaft section in the axial direction with the sensor units sandwiched therebetween.

7. The shifting operation detecting apparatus according to claim 1, wherein the shift operation detecting means is formed such that a diameter of an opening through which the outer shaft section of the shifting operation receiving section passes is reduced at an outside in a vehicle width direction farther than the outer wall to be smaller than that of a through-hole formed in an outer wall of the gearbox case.

8. The shifting operation detecting apparatus according to claim 1, wherein the shift operation detecting means has a sensor case fixed to the gearbox case, and a shaft receiving section configured to rotatably support the outer shaft section is installed in an area of the sensor case through which the outer shaft section passes.

* * * * *